UNITED STATES PATENT OFFICE.

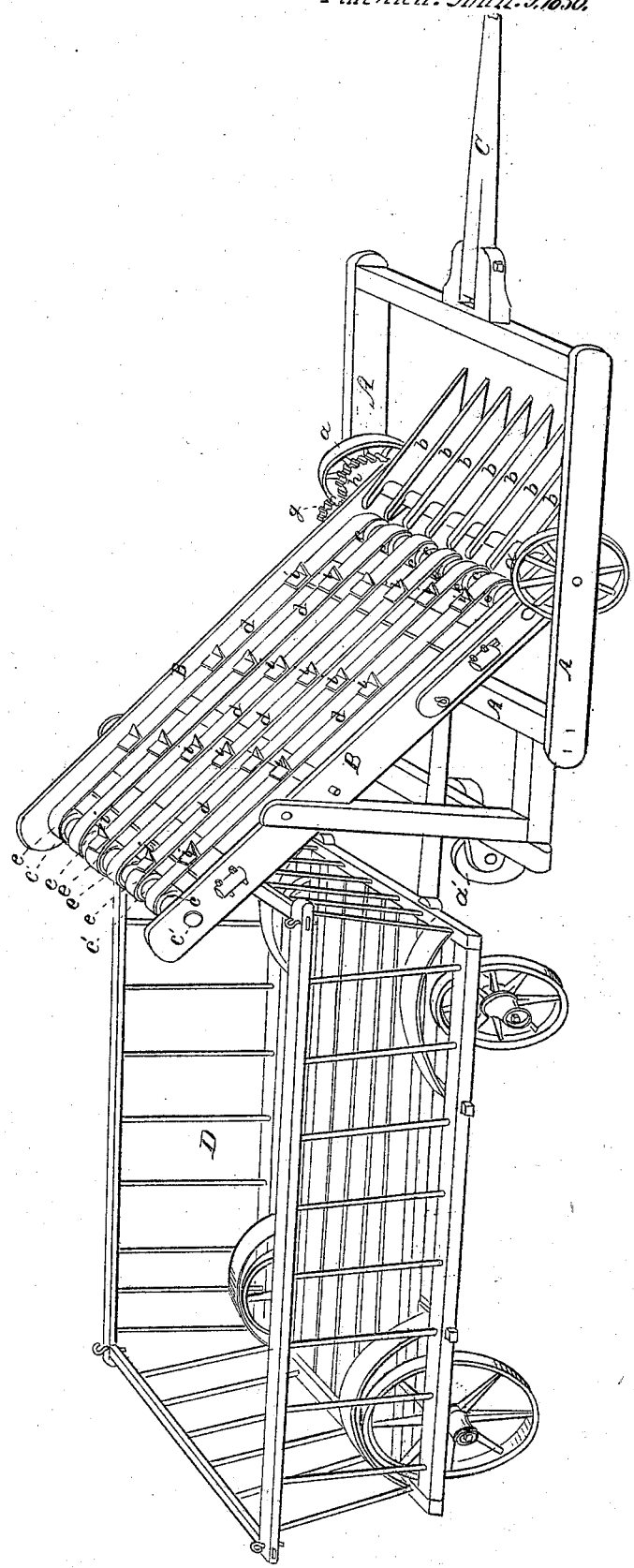
B. M. Townsend,
Hay Loader.
No. 7277. Patented April 9, 1850.

BENJ. M. TOWNSEND, OF QUINCY, ILLINOIS.

IMPROVEMENT IN MACHINES FOR RAKING AND LOADING HAY.

Specification forming part of Letters Patent No. 7,277, dated April 9, 1850.

*To all whom it may concern:*

Be it known that I, BENJAMIN M. TOWNSEND, of Quincy, in the county of Adams and State of Illinois, have invented a new and useful Machine for Raking and Loading Hay, &c., of which the following is a full, clear, and exact description, reference being made to the accompanying drawing, forming part of this specification, which represents a perspective view of my raker.

The nature of my invention consists in combining a toothed rake, by which the hay is gathered, with elevating-bands, which take the hay from the rake-teeth and elevate it into the body of a hay-wagon connected with the raker.

In the drawing, A is the frame of the machine. It is quadrangular, and is supported on three wheels, $a\ a\ a'$, two of which, $a\ a$, run on the opposite ends of an axle extending transversely across the frame. The third wheel, $a'$, is hinged by an arm to the hinder cross-bar of the frame, so that it can move like the roller of a furniture-caster when the machine is turned.

The rake-teeth $b\ b\ b$ are hinged to the front of the machine, either on the axle of the front wheels or in any other suitable manner, and project forward to gather the hay.

An inclined frame, B, is erected on the main frame A of the raker to support the elevating-bands. This frame, at its front end, extends below the upper surface of the rake-teeth, and rises, as it recedes from them, until its hinder extremity is sufficiently high to discharge the hay into the wagon-body. A horizontal shaft, $c$, extends transversely across the lower part of the frame, and a corresponding horizontal shaft, $c'$, crosses its upper extremity. Each of these is furnished with pulleys $e\ e\ e$, over which the elevating-bands $d\ d\ d$ are strained. The pulleys correspond with the spaces between the rake-teeth, and the bands are furnished with suitable projecting teeth, $i$, or bars, to give them a better hold upon the hay. The lower horizontal shaft, $c$, has a cog-wheel, $g$, mounted upon one of its extremities, which gears into a corresponding cog-wheel, $h$, attached to one of the running-wheels $a$, so that the bands are driven and the hay elevated by the progressive motion of the machine.

The horses are attached to a pole, C, projecting in front of the machine, and the hay-wagon D is connected with the frame of the raker by its pole, so that it follows to receive the hay from the elevating-bands.

The raker and wagon thus connected and arranged are drawn forward, and the hay collected by the rake-teeth is rapidly elevated and discharged into the wagon-body, thus saving the labor expended in pitching the hay upon it, and requiring only the same number of hands as the common horse-rake for raking alone. When the wagon is filled it is disconnected from the raker and an empty one substituted in its place.

A series of narrow elevating-bands are superior to a single broad belt, as they travel independently of each other, and do away with the loss of power caused by the slipping and straining of a broad band whose drums are not exactly of equal diameter through their whole length. They also possess the additional advantage of entering between the rake-teeth, so that no space need be left between their hinder extremities and the revolving bands.

What I claim as my invention, and desire to secure by Letters Patent, is—

The simultaneous raking and loading of hay from the ground by machinery, substantially as herein set forth, whereby the labor of making windrows and cocking, as in the usual process of hay-making, is saved, at the same time that the operation is both expedited and cheapened.

In testimony whereof I have hereunto affixed my name this 6th day of October, A. D. 1849.

B. M. TOWNSEND.

Witnesses:
 WM. D. WASHINGTON,
 S. W. WOOD.